W. C. ANDERSON & A. R. THOMPSON.
CONTINUOUS COOKER.
APPLICATION FILED JULY 19, 1911. RENEWED SEPT. 23, 1913.
1,198,510.
Patented Sept. 19, 1916.
2 SHEETS—SHEET 1.
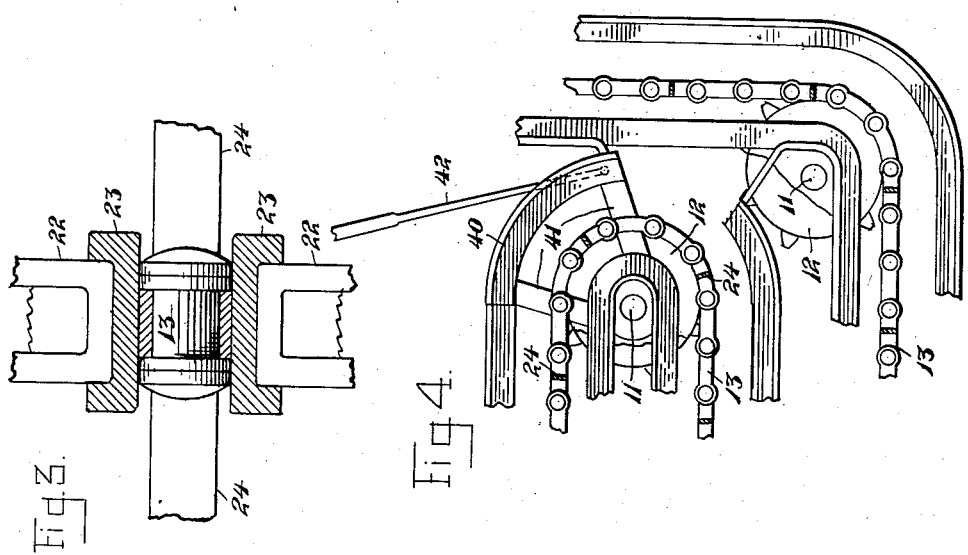
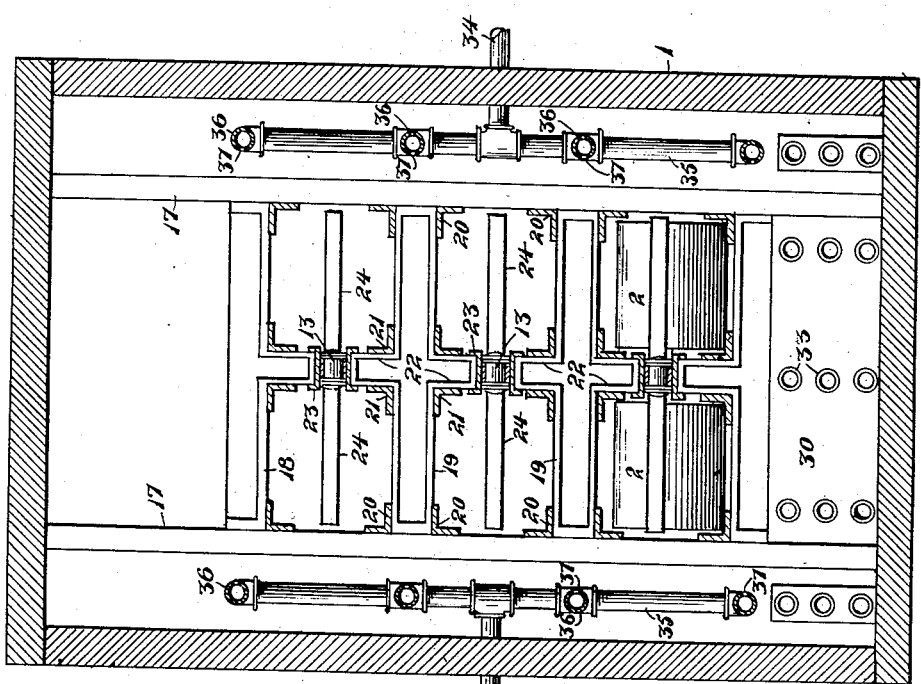

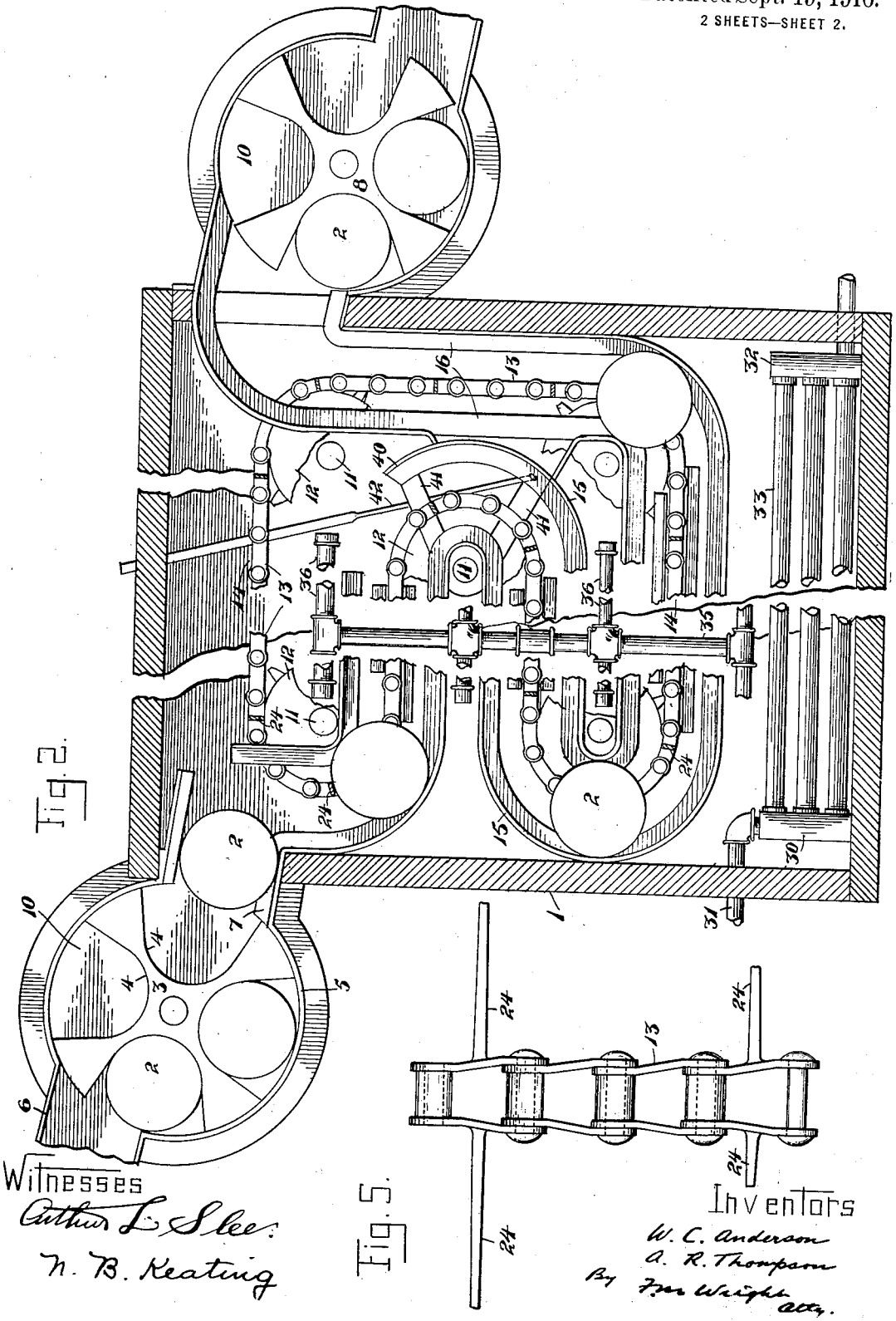

UNITED STATES PATENT OFFICE.

WILLIAM C. ANDERSON AND ALBERT R. THOMPSON, OF SAN JOSE, CALIFORNIA, ASSIGNORS TO ANDERSON-BARNGROVER MFG. CO., OF SAN JOSE, CALIFORNIA, A CORPORATION OF CALIFORNIA.

CONTINUOUS COOKER.

1,198,510.      Specification of Letters Patent.     Patented Sept. 19, 1916.

Application filed July 19, 1911, Serial No. 639,416. Renewed September 23, 1913. Serial No. 791,402.

*To all whom it may concern:*

Be it known that we, WILLIAM C. ANDERSON and ALBERT R. THOMPSON, citizens of the United States, residing at San Jose, in the county of Santa Clara and State of California, have invented new and useful Improvements in Continuous Cookers, of which the following is a specification.

This invention relates to the class of cookers used particularly in the canning art.

The objects of the invention are to economically and effectively increase the machine's capacity by providing a system of can-guides and coöperating conveyer adapted to pass cans through in pairs; to provide a can-guide system adapted for properly handling the cans whether the machine be used with steam, hot air, or hot water, as the heating medium; to provide a can-path through the machine adapted for regulation as to length and the consequent regulation of the time to which the cans are subjected to the cooking operation; and generally to provide a simple and effective machine of this class.

To these ends the invention consists in the novel continuous cooker illustrated in the accompanying drawings and which we shall now fully describe.

In the accompanying drawings, Figure 1 is a vertical transverse section of our improved machine; Fig. 2 is a broken longitudinal section thereof; Fig. 3 is an enlarged sectional view of a detail of the conveying chain; Fig. 4 is a portional view similar to Fig. 2 of parts shown in said figure but in a different position; Fig. 5 is an enlarged detail view of the conveying chain.

Referring to the drawing, 1 indicates the casing or box of our improved cooker. The cans, shown at 2, are delivered to the upper portion of one end of said casing by a revolving feeder 3, formed with a circumferential series of pockets 4 for the cans, and rotating within a cylindrical casing 5, said feeder receiving the cans from a chute 6 entering said casing, and delivering said cans to the machine by a chute 7. A discharger 8, precisely similar in construction to the feeder 3, is provided at the other end of the machine, to which discharger the cans are elevated by mechanism to be presently described. The cans enter said feeder and are discharged therefrom in pairs, the members of said pairs being in end alinement as seen in Fig. 1, the feeder and discharger being each formed with a diaphragm 10 at right angles to the shafts thereof and midway the ends.

11 indicates shafts mounted transversely in the machine, rotated by any suitable means, not here shown, and carrying sprocket wheels 12 engaging an endless sprocket chain 13. The shafts and sprocket wheels are so arranged that the sprocket chain assumes a tortuous form, that is, it contains a number, dependent upon the number of sprocket wheels, of longitudinal reaches or courses 14 arranged to move in alternately opposite directions, curved portions 15 between said reaches, and a vertical discharge portion 16 near the discharge end of the machine. Bars or arms 24 extend transversely to the chain on opposite sides thereof, being formed integral with certain links thereof, as shown in Fig. 5.

Secured in said casing are vertical bars 17 to which are secured upper and mediate cross-pieces or castings 18, 19, to which castings and also to the bars 17, are secured horizontal portions of angular bars 20, forming guideways, similar angular bars 21 being similarly secured to central vertical extensions 22 of said casting. The angular bars 20 and 21 which form one pair of guides are separated by a distance less than the length of the cans, as seen in Fig. 1, so that the cans may roll thereon; and in like manner the angular bars which form the upper pair of guides are similarly separated, and the two pairs, upper and lower, are separated vertically by a distance but little in excess of the diameter of the cans, whereby a practically close can-pathway is provided which will both keep the can from dropping by gravity and from rising by buoyancy as when they are submerged in water. Channel bars 23 are also secured to the ends of said extensions, and between said channel bars the chain 13 is guided. The angular bars or guideways 20 are so formed as to be substantially at uniform distances from said chain, the portions of the angle bars or guideways below the chain serving to support the cans against the force of gravity, and those above the chain against their buoyancy when immersed in water. Said guideways are adapted to receive the cans falling from the chute 7 and extend upwardly, parallel with the discharge portion of the chain, to guide the cans into the discharger 8.

It will be seen from the above that the cans, as they descend in pairs from the feeder, drop within the respective conduits formed by the guideways on opposite sides of the chain, and between the bars 24 which extend transversely from said chain, and are first, by said chain, advanced nearly the length of the casing 1, which may be of any desired magnitude. They then drop on to a lower reach of the guideways, in which they are moved in the reverse direction, and so on, finally being elevated by the chain, and conveyed to the discharger from whence they are discharged. By this arrangement a single conveyer chain is adapted to propel a pair of cans through a double pathway. This is an advantage not only in the mere fact of increasing the capacity of the machine, but also in the fact that as there is only one chain there is no chance for inaccuracy in point of timely operation nor necessity for readjustment due to unequal stretching of plural chains.

For heating the interior of said casing we provide inlet heads 30 to which steam is supplied by pipes 31, and outlet heads 32, said heads being connected by longitudinal pipes 33. In addition, live steam is supplied to the interior of the casing by pipes 34 connected with vertical pipes 35 which connect with longitudinal pipes 36, suitably apertured, as shown at 37, to discharge the live steam into the interior of the machine.

It is very desirable to make variable the length of the path of the cans in the machine, so that the length of time during which they are cooked may be varied independently of the rate of feed or discharge. To vary the length of said path we provide, at each return bend adjacent to the discharge end of the machine, (in the present instance only one such return bend being shown) a curved gate 40 secured to arms 41, and thereby pivoted upon a shaft 11 at each return bend, said gate being operated by a handle 42 extending upwardly to the exterior of the machine. Upon raising said handle, the gate is raised, so that the cans, on arriving at said return bend, and, dropping thereat, pass through the opening left by said gate, and descend to the discharge or elevating portion of the guideway, and are then elevated by the chain and conveyed to the discharger. But upon dropping said gate, the cans are, by said gate, compelled to travel farther, through approximately twice the length of the machine, and are then discharged, if the gate at the next return bend at the discharge end of the machine is open. In this way the length of the path traveled by the cans can be greatly varied.

On account of the casing, the feeder and the discharger being steam tight, steam at a high pressure can be passed through the pipes 34 and introduced into the interior of the machine by the pipes 36, and the cans can thus be cooked at a high heat. If boiling heat only is required, the machine is filled with hot water and retained at boiling temperature by the introduction of live steam through the pipes 36.

We claim:—

1. A continuous cooker comprising a box having a feed opening through one of its walls near its upper portion and a discharge opening through the opposite wall near its upper portion; means for heating said box; can-guides within the box disposed to form a continuous zigzag path in a vertical plane, the uppermost course of the guide-path being in communication with the feed opening of the box and the lowermost course thereof rising to and being in communication with the discharge opening of said box, said rising portion of the guide-path having a can communication with an adjacent end of an intervening course of the guide-path; a movable gate arranged to control said can communication; and a traveling conveyer within the box having means for propelling the cans throughout said guide path from the feed opening to the discharge opening.

2. A continuous cooker comprising a box having a feed opening through one of its walls near its upper portion, and a discharge opening through the opposite wall near its upper portion; means for heating said box; vertically opposing parallel pairs of can-guides separated by a distance exceeding the diameter of the cans, and the members of each pair being separated by a distance less than the length of said cans, said guides being arranged within the box in a continuous zigzag course in a vertical plane, the uppermost course of the guides being in communication with the feed opening of the box and the lowermost course of said guides rising to and being in communication with the discharge opening of said box, said rising portion of the guide course having a can communication with an adjacent end of an intervening guide course; a movable gate arranged to control said can communication; and a traveling conveyer within the box having means for propelling the cans throughout a course between said guides from the feed opening to the discharge opening.

3. A continuous cooker comprising a box, and means for heating said box, wheels in the box arranged to rotate about horizontal axes, an endless conveyer chain supported by said wheels in substantially horizontal courses, and bending in vertical planes between the courses, pusher bars extending from said chain equally on both sides thereof, bars at substantially uniform distance from said chain and arranged to form alternately upper and lower guideways for cans moved by said chain, said bars or guides extending upwardly at the discharge end of the box to form guideways to deliver the cans to the upper end thereof, one of said guideways, which extends horizontally, being formed with a passage into said upwardly extending guideway, and a movable gate for controlling said passage.

4. A continuous cooker comprising a box; means for heating said box; cross pieces in said box, each having a raised central portion; a double can-guide carried by said cross pieces, one on each side of and in a plane lower than the raised central portion of said cross pieces and arranged to provide a path for two cans in end alinement; and a single traveling conveyer-chain guided by the raised central portion of the cross pieces, and having pusher-bars extending laterally into the can-path on each side, for propelling the cans along the double path in unison.

In testimony whereof we have hereunto set our hands in the presence of two subscribing witnesses.

WILLIAM C. ANDERSON.
ALBERT R. THOMPSON.

Witnesses:
E. D. JOHNSON,
F. L. BURRELL.